United States Patent [19]
Lhuissier et al.

[11] Patent Number: 5,641,204
[45] Date of Patent: Jun. 24, 1997

[54] VEHICLE SEAT BACK COVER AND A SEAT INCLUDING SUCH A COVER

[75] Inventors: Pascal Lhuissier, Beaugency; Nicolas Guguin, Etampes; Alain Le Breton, Ville d'Avray; Jean Perthuis, Beuille le Comte, all of France

[73] Assignee: Bertrand Faure Equipements SA, Boulogne, France

[21] Appl. No.: 598,167

[22] Filed: Feb. 7, 1996

[30] Foreign Application Priority Data

Feb. 8, 1995 [FR] France ................ 95 01442

[51] Int. Cl.$^6$ ................ A47C 7/02
[52] U.S. Cl. ................ 297/452.6; 297/452.48
[58] Field of Search ................ 297/218.2, 218.1, 297/452.6, 452.59, 452.58, 228.1, 228.13, 452.48

[56] References Cited

U.S. PATENT DOCUMENTS

| | | |
|---|---|---|
| 2,823,736 | 2/1958 | Brody . |
| 3,363,271 | 1/1968 | Schneider ............ 297/452.6 X |
| 3,630,572 | 12/1971 | Homier ............ 297/452.6 |
| 3,961,823 | 6/1976 | Caudill, Jr. ............ 297/452.6 |
| 4,317,591 | 3/1982 | Ramsey ............ 297/452.6 |
| 4,558,905 | 12/1985 | Natori ............ 297/452.6 |
| 4,579,389 | 4/1986 | Shimbori et al. ............ 297/452.6 |
| 4,693,511 | 9/1987 | Seltzer et al. . |

FOREIGN PATENT DOCUMENTS

| | | |
|---|---|---|
| 1307103 | 9/1962 | France . |
| 42 19 657 | 12/1993 | Germany . |
| 541917 | 12/1941 | United Kingdom . |
| 2277441 | 11/1994 | United Kingdom . |

Primary Examiner—Milton Nelson, Jr.
Attorney, Agent, or Firm—Larson and Taylor

[57] ABSTRACT

A cover for covering a vehicle seat back is designed to be put into place on the seat back by being turned progressively the rightway out. The cover includes vertical fixing strips designed to penetrate into vertical slots formed in the front face of the foam padding of the seat back to be fixed to fastening members disposed inside the vertical slots. Each fixing strip is a sheet of flexible material having a longitudinal edge sewn to the inside of the cover and a free longitudinal edge that penetrates into the slot to be fixed to the fastening members therein. The free edge is reinforced by an inextensible cord sewn along the free edge and extending without folds along the edge.

7 Claims, 2 Drawing Sheets

5,641,204

VEHICLE SEAT BACK COVER AND A SEAT INCLUDING SUCH A COVER

The invention relates to covers for the backs of vehicle seats, and in particular for vehicles such as cars.

BACKGROUND OF THE INVENTION

More particularly, the invention relates to a cover designed to cover a vehicle seat back, the seat back having a front face provided with foam padding, a back face, a substantially horizontal top margin, and two substantially vertical side margins, the padding having at least one substantially vertical slot opening out towards the front face of the seat back and extending over a certain depth through the thickness of said padding, the seat back further including at least one fastening member disposed inside each vertical slot of the padding, the cover having front and back faces corresponding respectively to the front and back faces of the seat back and interconnected along three margins corresponding respectively to the top margin and to the two side margins of the seat back, the cover thus being capable of being put onto the seat back by being turned progressively the rightway out, like putting on a sock, the cover including, corresponding to each vertical slot in the padding, a "vertical" fixing strip designed to penetrate into the corresponding vertical slot to be fixed to each fastening member contained within said vertical slot, said vertical fixing strip being a sheet of flexible material having a longitudinal edge sewn to the inside of the cover and a free longitudinal edge which penetrates into the slot.

The fixing strips in question serve to secure the front face of the cover to the foam padding by exerting a force urging the cover against the padding.

Covers of this kind are known in which each sheet of flexible material constituting a vertical fixing strip is reinforced along its free edge by molding thermoplastic material onto the free edge to form cane-like beading. The fixing strips are attached to the fastening members under such circumstances by means of clips which penetrate into holes provided through the sheet of flexible material behind the beading of thermoplastic material.

Nevertheless, such known covers suffer from the drawback that the beading of thermoplastic material is relatively stiff, so that firstly the beading is difficult to manipulate while the cover is being put into place by being turned progressively the rightway out onto the seat back, and secondly the beading may break while the cover is being put into place.

OBJECTS AND SUMMARY OF THE INVENTION

A particular object of the present invention is to mitigate those drawbacks.

To this end, according to the invention, the free edge of each vertical fixing strip is reinforced by an inextensible flexible cord sewn along said free edge and extending without folds along said edge, the vertical fixing strip thus having substantially no resistance against folding.

Thus, the free edge of the sheet of flexible material is sufficiently reinforced to withstand the forces due to each vertical fixing strip being fastened in the corresponding vertical slot of the padding of the back, and it retains its flexibility so as to lend itself well to the cover being turned the rightway out while it is being put into place.

In preferred embodiments, one or more of the following dispositions is also used:

the free edge of each vertical fixing strip is gathered, the gathering being held in place by the inextensible cord sewn along said free edge: the gathering increases the mechanical strength of the fixing strip, and it may optionally also make it possible to impose a certain amount of curvature to the front face of the cover, which curvature may in turn make it possible to limit the number of fixing points between the fixing strip and the fastening member situated in the corresponding slot of the seat back padding;

each vertical fixing strip has at least two fixing holes passing therethrough, each hole being located between the inextensible cord of the strip and the longitudinal edge of said strip which is sewn to the inside of the cover;

the flexible material constituting each vertical fixing strip includes a textile cloth;

the inextensible cord is a textile cord;

the cover is designed to cover a seat back whose padding has two substantially vertical slots and a substantially horizontal slot opening out towards the front face of the seat back and extending a certain depth into the thickness of said padding, said horizontal slot extending between the two vertical slots, the cover including, in correspondence with the two vertical slots, the two above-mentioned respective vertical fixing strips, and in correspondence with the horizontal slot, a "horizontal" fixing strip designed to penetrate into said horizontal slot to be fixed to the fastening member included in said horizontal slot, the horizontal fixing strip being in the form of a sheath which extends longitudinally between two ends respectively disposed in the vicinity of the two vertical fixing strips, the sheath containing a stiff rod which extends between two hooks projecting from respective ends of the sheath and each penetrating into a fixing hole formed in the corresponding vertical fixing strip between the inextensible cord of said strip and the longitudinal edge of said strip which is sewn to the inside of the cover: after the horizontal fixing strip has been fastened inside the corresponding horizontal slot of the seat back padding, each vertical fixing strip is then held inside the corresponding vertical slot by two hooks, thereby making it possible to limit the number of fasteners needed for holding the vertical fixing strips in their corresponding slots; this disposition is particularly advantageous because it is much easier to fasten a horizontal fixing strip than it is to fasten a vertical fixing strip given the way in which the cover is put into place on the seat back; and the vertical fixing strip extends longitudinally between two ends in the vicinity of which the inextensible cord is sewn on said strip, joining the edge of said strip which is sewn to the inside of the cover, the inextensible cord thus being itself sewn directly to the inside of the cover at the two ends of said strip.

The invention also provides a vehicle seat including a back covered by a cover.

BRIEF DESCRIPTION OF THE DRAWINGS

Other characteristics and advantages of the invention appear on reading the following detailed description of two embodiments given as non-limiting examples, and described with reference to the accompanying drawings.

In the drawings.

In the various figures, the same references are used to designate elements that are identical or similar.

MORE DETAILED DESCRIPTION

Figure 1:
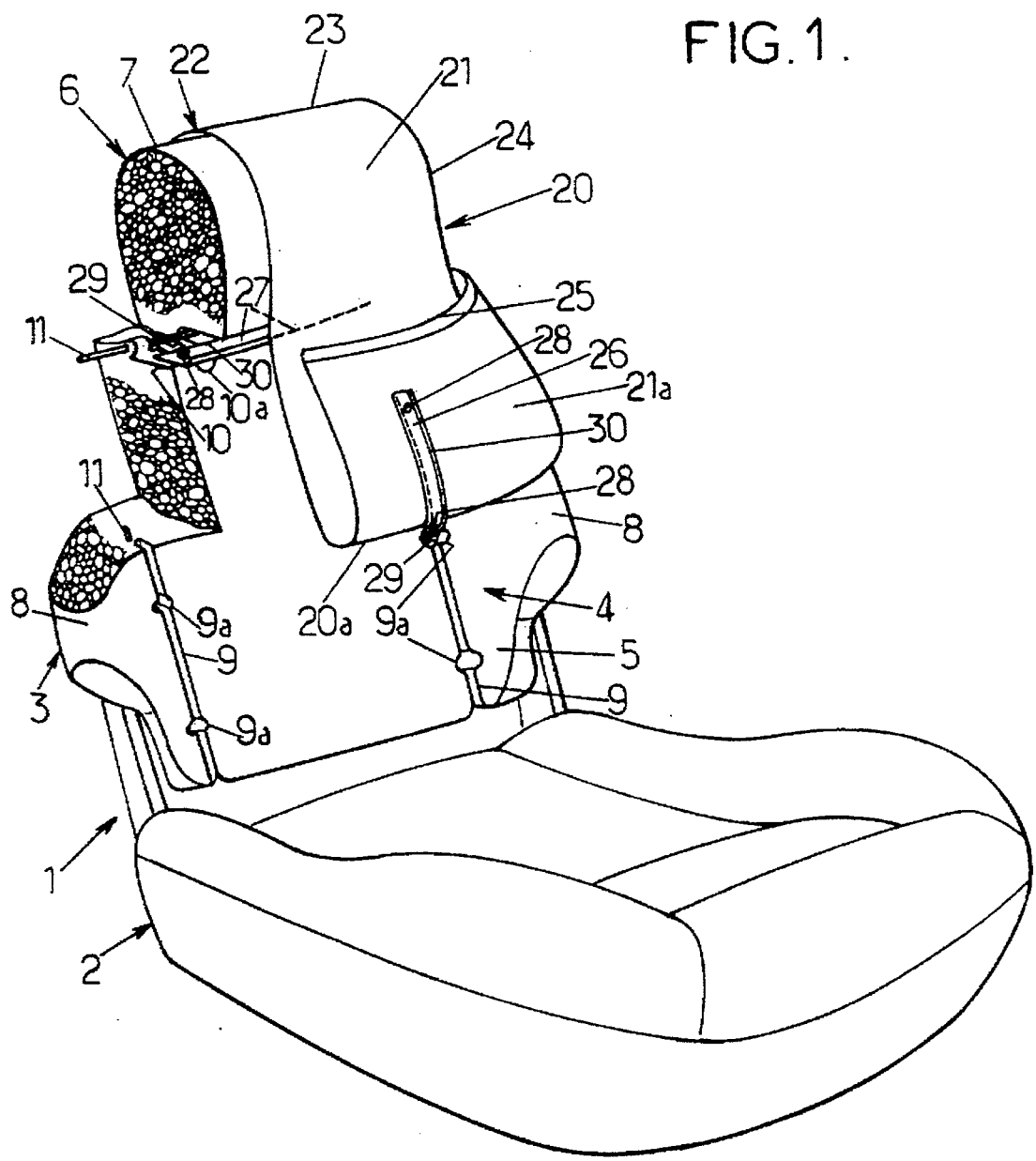
FIG. 1 is a diagrammatic cutaway perspective view of a cover of the invention while it is being put into place on the back of a car seat.

FIG. 1 shows a vehicle seat 1 having a seat proper 2 and a seat back 3.

The seat back 3 has a front face 4 formed by foam padding 5, a back face 6 generally provided with a metal frame (not shown), a substantially horizontal top margin 7, and two substantially vertical side margins 8.

The foam padding 5 has two substantially vertical slots 9 which extend close to the side margins 8, with these slots being connected together near the top by a substantially horizontal slot 10.

Each of the slots 9 and 10 opens out in the front face 4 of the seat back and it extends a certain depth into the thickness of the foam padding 5.

In addition, in the example shown, each of the slots 9 and 10 has various spot enlargements given respective references 9a and 10a, for a purpose described below.

Inside the foam padding 5, there is embedded a stiff metal wire 11 which follows the outline of the three slots 9 and 10. At the enlargements 9a and 10a, the slots 9 and 10 are preferably locally deeper so that the wire 11 appears locally in the bottoms of said slots 9 and 10.

The seat back 3 is covered by a cover 20 which has a front face 21 designed to cover the front face 4 of the seat back, a back face 22 designed to cover the back face 6 of the seat back, said two faces being interconnected by a top margin 23 and by two side margins 24, the cover further includes an open bottom 25.

In this way, it is possible to put the cover 20 onto the seat back 3 by first turning the cover insideout, then positioning the top margin 23 of the cover on the top margin 7 of the seat back, then progressively turning the cover the rightway out so that it moves down the seat back 3, like putting on a sock. While this is taking place, the cover 20 has an annular fold 20a that moves progressively down the back 3.

On the inside 21a of the front face 21, the cover has two vertical fixing strips 26 and a horizontal fixing strip 27 which are disposed to correspond respectively with the two vertical slots 9 and with the horizontal slot 10 in the foam padding.

The fixing strips 26 and 27 are provided with fixing holes 28 disposed to correspond with the enlargements 9a and 10a in the slots 9 and 10.

While the cover 20 is being put into place by being turned progressively the rightway out onto the seat back 3, the operator installing the cover begins by inserting the horizontal fixing strip 27 into the horizontal slot 10, and by fixing the strip 27 to the bottom of the slot by means of metal clips or hooks 29, or by similar fasteners. Each clip 29 passes through a fixing hole 28 in the strip 27 and is also hooked on the stiff metal wire 11 in a corresponding enlargement 10a of the slot.

Thereafter, as the operator progressively turns the cover 20 the rightway out, the two vertical fixing strips 26 are inserted progressively into the two vertical slots 9 and clips 29 are fixed between the fixing holes 28 in the strips 26 and the stiff metal wire 11, in each of the enlargements 9a in the vertical slots 9.

Figure 2:
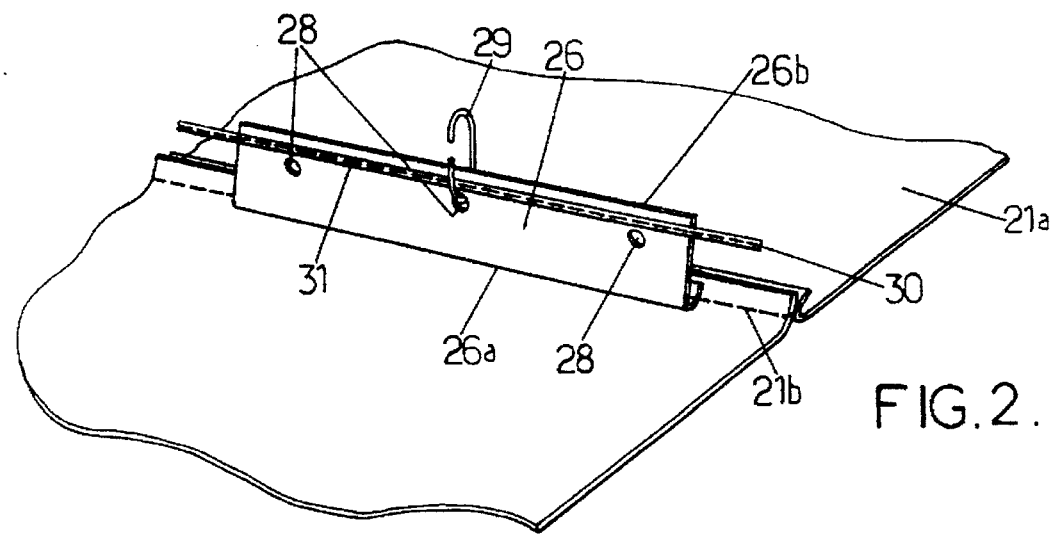
FIG. 2 is a detail view of the inside of the FIG. 1 cover.

As can be seen in greater detail in FIG. 2, each fixing strip 26 is constituted by a sheet of flexible material which has a first longitudinal edge 26a sewn on the inside 21a of the front face 21 of the cover, and a second longitudinal edge 26b which is free prior to the strip 26 being fixed in the corresponding slot 9.

The flexible material constituting the strip 26 may be a textile cloth, optionally coated in a continuous film of synthetic material, or this material may be a sheet of synthetic material that is floppy, offering substantially no resistance to bending.

The longitudinal edge 26a is preferably sewn to the cover along a seam 21b which serves to fix together two pieces of said cover.

Also, according to the invention, the free edge 26b of the cover is reinforced by an inextensible cord or braid 30 which is sewn along said free edge by stitches 31 and which extends without any folds or kinks along said edge. The cord 30 is preferably a flat textile cord.

Since the fixing holes 28 are disposed between the cord 30 and the edge 26a of the fixing strip 26, the return force exerted by the clips 29 is distributed by the cord 30, thereby enabling the strip 26 to withstand said force without being damaged, while nevertheless avoiding stiffness which would impede installation of the cover.

As can be seen diagrammatically in FIG. 1, the horizontal fixing strip 27 may optionally itself be constituted in identical or similar manner to the fixing strips 26, i.e. in the form of a flexible sheet with an inextensible cord 30 sewn along its free edge.

The sheet of flexible material constituting each fixing strip 26 and optionally the fixing strip 27 is preferably gathered along its free edge, with the gathering then being held in place by the stitching of the inextensible cord 30 along said free edge.

The gathering serves to further reinforce the mechanical strength of the fixing strips 26 and 27, and it may also serve to impart a certain amount of natural curvature to the front face 21 of the cover. This natural curvature optionally serves to limit the number of clips 29 needed to hold the front face 21 of the cover against the front face 4 of the seat back padding: the strip 26 or 27 can thus be held in place with only two clips or other fastening means, disposed at respective ends of the fixing strip 26 or 27.

The horizontal fixing strip 27 may optionally be made as in the prior art, as a sheet of flexible material reinforced along its free edge by relatively stiff overmolded thermoplastic beading: this horizontal fixing strip 27 has no need to be folded longitudinally while the cover 20 is being put into place by being turned progressively the rightway out, unlike the vertical fixing strips 26.

Figure 3:
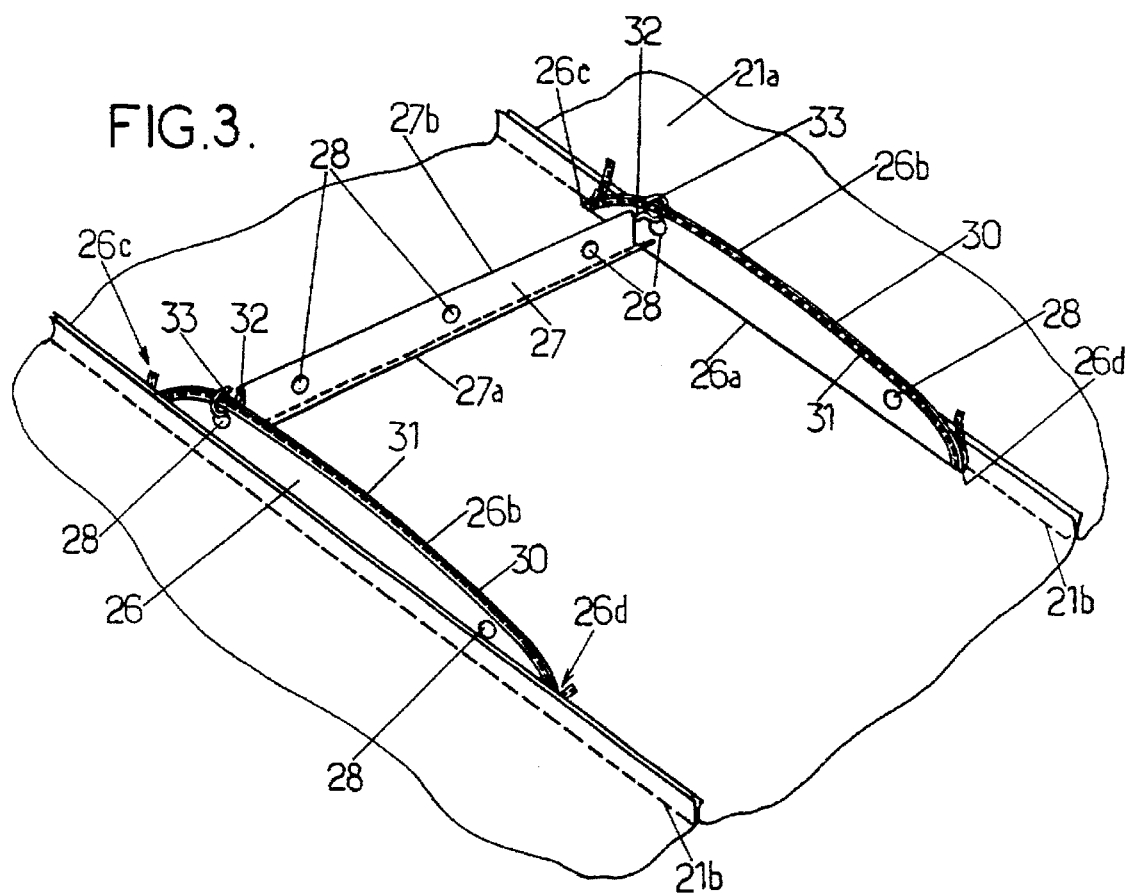
FIG. 3 is a fragmentary perspective view of the inside of a cover constituting another embodiment of the invention.

As shown in FIG. 3, the fixing strip 27 may optionally be in the form of a case or sheath with a longitudinal edge 27a sewn to the inside 21a of the front face of the cover and a free edge 27b which is pierced by fixing holes 28.

A stiff metal wire rod 32 may be placed in the sheath 27, running between two ends having respective hooks 33. Each hook 33 projects beyond one of the longitudinal ends of the sheath 27 and it passes through a fixing hole 28 in the fixing strip 26 close to the top end 26c of the strip 26.

In this case, the horizontal fixing strip 27 includes, as before, fixing holes 28 which receive the above-mentioned clips 29 or the like for fixing the fixing strip 27 in the corresponding horizontal slot 10.

The clips 29 then fasten to the rod 32 which is disposed against the free edge 27b of the horizontal fixing strip 27.

The rod 32 is thus held in the bottom of the slot 10 so that the top ends 26c of the two vertical fixing strips 26 are likewise held in the bottoms of their respective slots 9 by the hooks 33.

In this embodiment, each vertical fixing strip 26 may optionally include, in addition to the two fixing holes 28 already occupied by the hooks 33, no more than one respective additional fixing hole 28 disposed close to the bottom end thereof 26d.

In this case, when the cover 20 is being put into place on the seat back 3, the operator need only begin by fixing the horizontal fixing strip 27 inside its horizontal slot 10 by installing clips 29 through the fixing holes 28 in the strip 27, followed by installing two clips 29 in the two fixing holes 28 situated close to the bottom ends of the two vertical fixing strips 26: this makes it simpler to put the cover into place.

In this embodiment, the free edge 26b of each vertical fixing strip 26 preferably runs into the edge 26a of said strip which is sewn to the cover at the top ends 26c and the bottom ends 26d of the strip, with the cord 30 also being fixed by the seam 21b to the front face of the cover at these ends 26c and 26d, thereby increasing the strength of the strip 26.

We claim:

1. A vehicle seat including a seat back overlaid by a cover,
   the seat back having a front face provided with foam padding, a back face, a substantially horizontal top margin, and two substantially vertical side margins, the padding having at least one slot extending longitudinally substantially vertically, said slot opening out towards the front face of the seat back and extending over a certain depth through the thickness of said padding, the seat back further including at least one fastening member disposed inside each vertical slot of the padding,
   the cover having front and back faces corresponding respectively to the front and back faces of the seat back and interconnected along three margins corresponding respectively to the top margin and to the two side margins of the seat back, the cover thus being capable of being put onto the seat back by being turned progressively the right way out, the cover including, corresponding to each vertical slot in the padding, a vertical fixing strip penetrating into the corresponding vertical slot and being fixed to each fastening member contained within said vertical slot, said vertical fixing strip being a sheet of easily foldable material having a longitudinal edge sewn to the inside of the cover and a free longitudinal edge which penetrates into the slot, wherein the free edge of each vertical fixing strip is reinforced by an inextensible and easily foldable cord which is sewn along said free edge by stitches penetrating in said cord, said cord extending without folds along said edge, the vertical fixing strip thus having substantially no resistance against folding.

2. A vehicle seat according to claim 1, in which the free edge of each vertical fixing strip is gathered, the gathering being held in place by the inextensible cord sewn along said free edge.

3. A vehicle seat according to claim 1, in which each vertical fixing strip has at least two fixing holes passing therethrough, each hole being located between the inextensible cord of the strip and the longitudinal edge of said strip which is sewn to the inside of the cover.

4. A vehicle seat according to claim 1, in which the foldable material constituting each vertical fixing strip includes a textile cloth.

5. A vehicle seat according to claim 1, in which the inextensible cord is a textile cord.

6. A vehicle seat according to claim 1, in which said seat back padding has two substantially vertical slots and further includes a substantially horizontal slot opening out towards the front face of the seat back and extending a certain depth into the thickness of said padding, said horizontal slot extending between the two vertical slots, the cover including, in correspondence with the two vertical slots, the two above-mentioned respective vertical fixing strips, and in correspondence with the horizontal slot a horizontal fixing strip designed to penetrate into said horizontal slot to be fixed to a fastening member included in said horizontal slot, the horizontal fixing strip being in the form of a sheath which extends longitudinally between two ends respectively disposed in the vicinity of the two vertical fixing strips, the sheath containing a stiff rod which extends between two hooks projecting from respective ends of the sheath and each penetrating into a fixing hole formed in the corresponding vertical fixing strip between the inextensible cord of said strip and the longitudinal edge of said strip which is sewn to the inside of the cover.

7. A vehicle seat according to claim 1, in which the vertical fixing strip extends longitudinally between two ends in the vicinity of which the inextensible cord is sewn on said strip, joining the edge of said strip which is sewn to the inside of the cover, the inextensible cord thus being itself sewn directly to the inside of the cover at the two ends of said strip.

* * * * *